April 27, 1965 KAZUHIRO FUJIMOTO 3,181,089

DISTORTION COMPENSATING DEVICE

Filed Nov. 22, 1960 2 Sheets-Sheet 1

Inventor
K. FUJIMOTO

By [signature]
Agent

Inventor
K. FUJIMOTO
By [signature]
Agent 3,181,089

DISTORTION COMPENSATING DEVICE

Kazuhiro Fujimoto, Tokyo, Japan, assignor to Nippon Electric Company, Limited, Tokyo, Japan, a corporation of Japan Filed Nov. 22, 1960, Ser. No. 70,979
Claims priority, application Japan, Nov. 25, 1959, 34/37,085
4 Claims. (Cl. 333—28)

This invention relates to devices for compensating distortions introduced in a transmission system.

A number of distortion compensating or correcting devices have been proposed in the prior art. Examples of such prior art devices are disclosed in U.S. Patent No. 2,790,956 and a paper by J. M. Linke, Dr.-Ing, entitled "A Variable Time-equalizer for Video-frequency Waveform Correction," published in 1952 in the "Proceedings of the Institution of Electrical Engineers" (Part IIIA, No. 18). These prior art devices utilize one or more delay lines, each having a number of taps along its length. These taps are respectively connected to capacitive potentiometers which sample the delay signal and are utilized to correct the distortion caused in the input signal wave.

The difficulty encountered with the device disclosed in U.S. Patent No. 2,790,956 is that it is quite complicated and requires two pairs of delay lines and vacuum tubes in order to operate. An improvement on the type of device generally indicated in said U.S. patent is proposed in the above-mentioned article by Linke. In order to facilitate adjustment of the potentiometers connected to the taps of the delay line and to improve the low frequency characteristics, Linke adds an adjustable resistive network or an RC network to the output of the device. However, both these arrangements have substantial drawbacks. For example, the adjustable restrictive network requires adjustment of both the variable capacitors and of the variable resistors; the RC network in the output, on the other hand, adds additional undesirable complex circuitry.

The object of the invention is therefore to simplfy the construction of an adjustable device which adequately compensates for the distortions due to loss or delay in a transmission system.

The above-mentioned and other features and objects of this invention and the manner of attaining them will become more apparent and the invention itself will be best understood by reference to the following description of an embodiment of the invention taken in conjunction with the accompanying drawings, in which.

Figure 1:
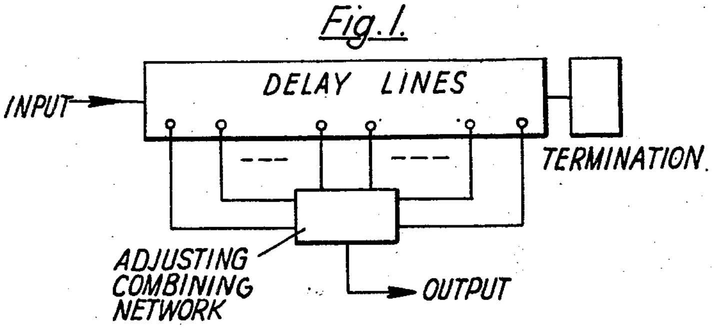
FIG. 1 shows a schematic diagram of a well known distortion compensating device.

Distortion compensating devices of the type shown in FIG. 1 are well known. The principle of operation of the devices generally indicated in FIG. 1, as well as that of the present invention is known in the prior art; for example, see U.S. Patent No. 2,790,956, column 2, line 32 to column 3, line 65. Accordingly the details of this theory will not be repeated herein. These devices consist of a delay line D, terminated at one end, and provided with a plurality of tappings. An input signal is applied at the non-terminated end and the magnitude and sign of the voltages at the tappings are adjusted. The adjusted voltages are then combined to compensate for the distortion in the associated system. However, the well known circuits for this purpose are generally too complicated. There is no satisfactory arrangement for adjusting voltages at tappings and for combining adjusted voltages.

The distortion compensating device, according to this invention, comprises a pair of delay lines terminated at one end thereof, a combining network for adjusting and combining the outputs at tappings and a high input impedance amplifier.

Figure 2:
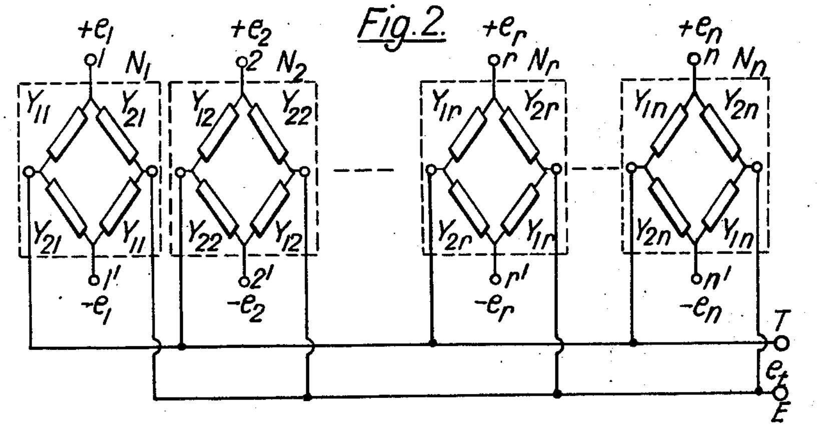
FIG. 2 shows a block diagram of the fundamental principle of a combining network employed in the present invention.

FIG. 2 shows the block diagram of the fundamental principle of a combining network for use in this invention. The variable units $N_r$ ($r=1, 2, \ldots n$) consist of four variable admittances, connected in bridge circuits as shown in the drawing. The bridges are designed so that the capacitors in opposite arms are always equal and so that the sum of capacitances of two adjacent arms is always constant. The variable units, as shown in the drawing, are fed with signal voltages $e_r$, $-e_r$ ($r=1, 2 \ldots n$) having different signs but of an equal magnitude. The remaining two connecting points, which have not been impressed with voltages, are connected in parallel to the corresponding points of a plurality of other variable units. The parallel points are designated as T and E respectively. The bridges are constructed by means of a simple differential capacitor arrangement generally similar to the device depicted in the aforementioned article by J. M. Linke and particularly as shown in FIGS 6 and 8 of said article, so that the sum of the adjacent two admittances is constant irrespective of adjustment; so it can be expressed as, $$Y_{1r}=K_rY_r(r=1, 2, \ldots n) \qquad (1)$$
$$Y_{2r}=(1-K_r)Y_r$$

Where $K_r$ is a constant defined by the setting of the adjustable arms of the bridges.

In the operation of this combining network, if the admittances connected between point E and each of the points $r$ and $r'$ and E are assumed to be sufficiently large compared with $Y_r$, the combined voltage $e_T$ between the parallel points T and E is expressed as:

$$e_T=\sum_{r=1}^{n}\frac{Y_r}{Y_s}\cdot(2K_r-1)\cdot e_r \qquad (2)$$

where $$Y_s=\sum_{r=1}^{n}Y_r$$

and $e_r$ is a voltage measured by setting point E as reference.) If $Y_r$ ($r=1, 2, \ldots n$) consists of the same kind of admittances, $$\frac{Y_r}{Y_s}$$

becomes constant and the combined voltage $e_T$ can be expressed as a linear combination of $e_r$ ($r=1, 2 \ldots n$). By adjusting the value of $K_r$ ($r=1, 2 \ldots n$), which is a constant defined by the settings of the adjustable arms of the bridges, it is possible to change the magnitude of the combining coefficient and the sign. And in the case of $Y_s \gg Y_r$ ($r=1, 2 \ldots n$), both of the equivalent admittances between the terminal E and each of the terminals $r$ and $r'$ become the constant $Y_r$, and $r$, $r'$ are balanced with respect to E. Accordingly, if this combining network is connected to tappings of the balanced delay line, the balanced condition will not be impaired and it is easy to compensate for the effect of the connection beforehand. Supplying the output of this combining network to a high impedance amplifier, a desirable compensating device with a simple construction is obtained.

Figure 3:
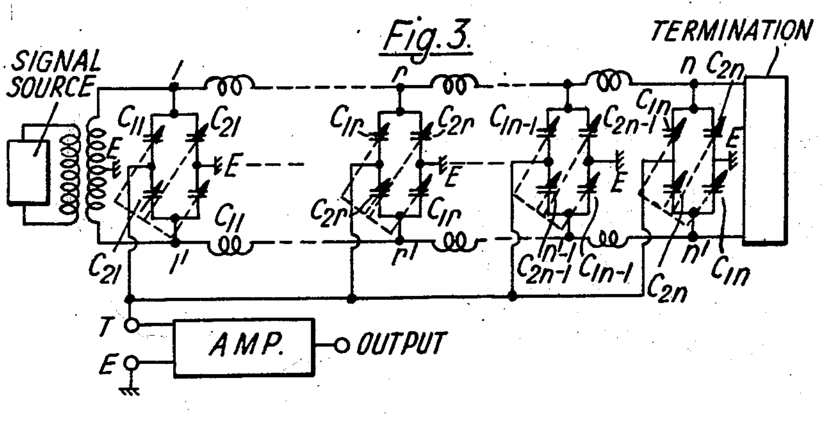
FIGS. 3 and 5 show circuit diagrams for the embodiments of this invention.

An embodiment of this invention will be shown in FIG. 3. An ordinary differential condenser is employed as a variable admittance element and each variable unit consists of four intercoupled capacitors. For simplicity, all the variable units are of the same construction. Then, $$C_{1r}=K_r C_d \quad 0<K_r<1 \qquad (3)$$
$$C_{r2}=(1-K_r)\cdot C_d \quad (r=1, 2 \ldots n)$$

Where $$C_d=Y_1=Y_2= \ldots =Y_n$$

The combined voltage $e_T$ between the terminals T and E can be expressed as:

$$e_T=\frac{1}{n}\sum_{r=1}^{n}(2K_r-1)\cdot e_r \qquad (4)$$

The equivalent capacities between the terminals $r$, $r'$ ($r=1, 2 \ldots n$) and the terminal E becomes $C_d$. This parasitic capacity $C_d$ can be easily realized through absorption by making the delay line as a low-pass type. The combined voltage $e_T$ generated between the terminals T and E is amplified by an amplifier which has a high input impedance with respect to the capacity $nC_d$. It goes without saying that various other performance characteristics are possible at the combined output $e_T$ by connecting a high input impedance device to the terminals T and E. Another embodiment of the invention will now be considered.

For low frequencies the leakage resistances of the four variable capacitors forming the variable units cannot be neglected. But, if all the leakage resistances are made equal by inserting resistances in parallel, then the requirements that the admittance of the opposite arms be equal and that the sum of the admittances for the adjacent two arms be constant will be fulfilled. If the leakage resistance is made R after each variable condenser has been compensated, the combined voltage $e_T$ is expressed in the form, $$e_T=\frac{1}{n\left(1+\frac{1}{R\cdot j\omega C_d}\right)}\cdot\sum_{r=1}^{n}(2K_r-1)\cdot e_r \qquad (5)$$

where $\omega=2\pi f$ and $f$ is the frequency.

From the above equation it is evident that an adjustment and combining is possible only with some frequency characteristic.

Figure 4:
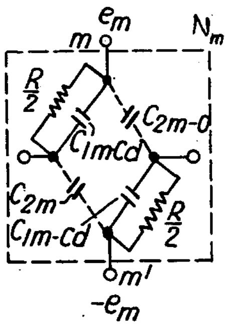
FIG. 4 shows a circuit diagram illustrating the embodiment of FIG. 5.

A further description will be given in a case where one unit is fixed. In this case $n$ units are utilized, each unit consisting of condensers as expressed in Equation 3. All the units except one are variable and each variable capacitor is made equal to R by compensating leakage resistance. The remaining fixed unit is designated as $N_m$, and the values as shown in FIG. 4 are:

$$K_m=1, \; C_{1m}=C_d, \; C_{2m}=0 \qquad (6)$$

Figure 5:
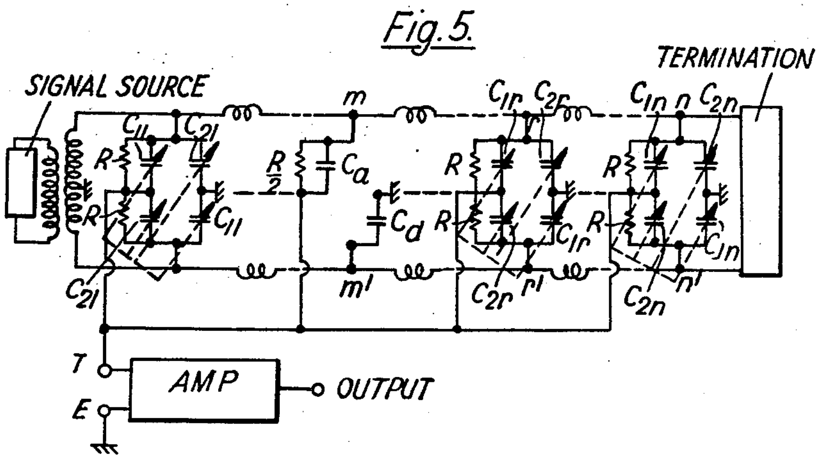

Further, the leakage resistance is equal to $$\frac{R}{2}$$

after $C_{1m}$ only has been compensated. This unit has, of course, equal opposite arms and the sum of the two adjacent admittances is constant. An example of a distortion compensating device incorporating a combining network comprising $n$ units, including the fixed unit as described, is shown in FIG. 5. In this case, the combined voltage $e_T$ is expressed as, $$e_T=\frac{e_m}{n}+\frac{1}{n\left(1+\frac{2}{R\cdot j\omega C_d}\right)}\cdot\sum_{r=1}^{n}(2K_r-1)\cdot e_r \qquad (7)$$

where $r \neq m$

A combining without any frequency characteristic can be realized as to the voltage $e_m$. And also, as the delay line connected between the terminal $r$, $r'$ ($r=1, 2, \ldots n$) and the terminal E has a sufficiently low impedance compared with the combining network, the capacitor leakage compensation between the terminals $r$, $r'$ ($r=1, 2, \ldots n$) and the terminal E can be omitted safely. FIG. 5 represents the case where such compensation is omitted.

Although the above-mentioned examples show the application of fundamental principle of this invention, other various embodiments of this invention are possible without departing from the spirit and the scope of this invention.

What is claimed is:

1. A distortion compensating device comprising
   - (1) a plurality of capacitive bridge circuits, each having a first and second pair of diagonally related junctions, and in each of which
     - (a) the capacitance of opposite arms are equal,
     - (b) the sum of the capacitances of adjacent arms is constant,
     - (c) two adjacent arms adjoining one of said second pair of junctions are each shunted by a resistor of fixed value,
   - (2) a pair of delay lines having a plurality of intermediate taps thereon and input terminals for connection to a signal source,
   - (3) means connecting said first pair of junctions of each bridge across said lines to a pair of corresponding taps,
   - (4) means for connecting each of said second junction pair of said bridges in parallel,
   - (5) and an output connection for said last mentioned means.

2. A distortion compensating device as set forth in claim 1 in which the delay lines are balanced and wherein the resistors shunting the adjacent arms are of equal value.

3. A distortion compensating device as set forth in claim 1 wherein all the capacitive bridges save one are variable.

4. A distortion compensating device as set forth in claim 1 and means for supplying signals to said input terminals which are equal in magnitude but opposite in phase.

References Cited by the Examiner

UNITED STATES PATENTS

| | | | |
|---|---|---|---|
| 1,882,631 | 11/32 | Jaumann | 333—74 |
| 1,941,384 | 12/33 | Bowles | 333—74 X |
| 2,124,599 | 7/38 | Wiener | 333—74 |
| 2,147,728 | 2/39 | Wintraugham | 333—74 |
| 2,278,620 | 4/42 | Meixell | 333—74 |
| 2,790,956 | 4/57 | Ketchledge | 333—28 |
| 2,984,799 | 5/61 | Gerks | 333—74 |

HERMAN KARL SAALBACH, *Primary Examiner.*

RUDOLPH V. ROLINEC, *Examiner.*